United States Patent
King et al.

(10) Patent No.: US 9,590,990 B2
(45) Date of Patent: Mar. 7, 2017

(54) ASSIGNING USER REQUESTS OF DIFFERENT TYPES OR PROTOCOLS TO A USER BY TRUST ASSOCIATION INTERCEPTORS

(75) Inventors: Jennifer E. King, Austin, TX (US);
Timothy J. Smith, Raleigh, NC (US);
Anthony W. Wrobel, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1391 days.

(21) Appl. No.: 12/463,583

(22) Filed: May 11, 2009

(65) Prior Publication Data
US 2010/0287600 A1    Nov. 11, 2010

(51) Int. Cl.
G06F 7/04      (2006.01)
H04J 3/16      (2006.01)
H04B 1/40      (2015.01)
H04L 29/06     (2006.01)
G06F 9/445     (2006.01)

(52) U.S. Cl.
CPC ............ H04L 63/0884 (2013.01); *G06F 8/65* (2013.01); *H04L 29/06* (2013.01)

(58) Field of Classification Search
CPC ................................ H04L 67/28; H04L 29/06
USPC ......................................................... 709/203
See application file for complete search history.

(56) References Cited

U.S. PATENT DOCUMENTS

| | | | | |
|---|---|---|---|---|
| 5,841,970 A * | 11/1998 | Tabuki | .................. | G06F 21/316 380/30 |
| 6,965,939 B2 * | 11/2005 | Cuomo et al. | ................ | 709/229 |
| 7,634,803 B2 * | 12/2009 | Birk et al. | ......................... | 726/8 |
| 7,954,144 B1 * | 5/2011 | Ebrahimi et al. | ................ | 726/12 |
| 8,127,345 B2 * | 2/2012 | Gregg | ................... | G06F 21/335 726/4 |
| 2002/0091757 A1 * | 7/2002 | Cuomo et al. | ................ | 709/203 |
| 2005/0154886 A1 * | 7/2005 | Birk et al. | ..................... | 713/168 |
| 2005/0210072 A1 * | 9/2005 | Bojinov et al. | ................ | 707/200 |
| 2005/0249219 A1 * | 11/2005 | Bajko et al. | ................ | 370/395.3 |
| 2007/0124471 A1 * | 5/2007 | Harada et al. | ................ | 709/225 |
| 2008/0028436 A1 * | 1/2008 | Hannel et al. | ..................... | 726/1 |
| 2008/0082987 A1 * | 4/2008 | Mao et al. | ..................... | 719/313 |
| 2011/0145590 A1 * | 6/2011 | Harada et al. | ................ | 713/185 |
| 2011/0145891 A1 * | 6/2011 | Bade | ..................... | H04L 63/101 726/4 |
| 2011/0231555 A1 * | 9/2011 | Ebrahimi et al. | ............ | 709/226 |
| 2011/0289560 A1 * | 11/2011 | Laitinen | ............... | H04L 9/3273 726/4 |

\* cited by examiner

*Primary Examiner* — Arvin Eskandarnia
*Assistant Examiner* — Margishi Desai
(74) *Attorney, Agent, or Firm* — Steven M. Greenberg, Esq.; CRGO LAW (57) ABSTRACT

A Universal TAI handles multiple identifications by means of an internal lookup table. When authenticating and authorizing requests, from a pre-registered customer, that are serviced by an application server, a reverse proxy security server receives requests of different protocols and associates user identification information of a single user with different formats based on the types and protocols of the requests. The Universal TAI determines a fundamental identification of the user from a lookup table, substitutes the fundamental identification into the requests of different protocols for the same user principal, and passes the request with the fundamental identification to the application server.

22 Claims, 6 Drawing Sheets

ASSIGNING USER REQUESTS OF DIFFERENT TYPES OR PROTOCOLS TO A USER BY TRUST ASSOCIATION INTERCEPTORS

BACKGROUND

1. Field

The invention relates generally to the use of trust association interceptors, and more specifically to a universal trust association interceptor that substitutes a fundamental identification in a request for a protocol identification.

2. Description of the Related Art

Application servers, such as IBM's WebSphere® Application Server, authenticate and authorize user requests for services and applications. When a user has been authenticated by an authentication system other than the application server hosting the requested service, the user's authentication may be communicated to the application server hosting the requested service rather than requiring the user to re-authenticate. This process is known as identity assertion and may be performed by a Trust Association Interceptor (TAI).

TAIs are components that determine a user's identification for an incoming request and assign the identification to user principals of the application server. A TAI propagates the user principal to the application server through the use of credentials that are used by downstream applications hosted by the application server.

TAIs generally imply that the application server works in conjunction with a reverse proxy security server, such as IBM's Tivoli Access Manager WebSEAL. A reverse proxy security server (RPSS) may act as a front-end authentication server while the applications hosted by the application server may apply their own authorization policies to a user's credentials.

Requests utilizing different protocols, such as the hypertext transfer protocol (HTTP) and the session initiation protocol (SIP), handle identification information in different ways. As a result, incoming requests that utilize different protocols may be issued different credentials, even though the same user generated the requests that utilize different protocols. A method for handling these issues comprises using additional separate components to track all the different credentials corresponding to a user, but using additional components increases system complexity. Another method for handling these issues comprises using duplicate sets of data that correspond to each request's type and protocol. Using additional components and duplicate sets of data is costly and inefficient.

Therefore, a need exists for a simple way for a single TAI to handle multiple identifications internally without a complicated architecture.

SUMMARY

In an embodiment, a Universal TAI handles multiple identifications by means of an internal lookup table. When authenticating and authorizing requests from a pre-registered customer that are serviced by an application server, a reverse proxy security server receives requests of different protocols and associates user identification information of a single user with different formats based on the types and protocols of the requests. The Universal TAI determines a fundamental identification of the user from a lookup table and substitutes the fundamental identification into the requests of different protocols for the same user principal, and passes the request with the fundamental identification to the application server.

DETAILED DESCRIPTION

As will be appreciated by one skilled in the art, the Universal TAI may be embodied as a system, method or computer program product. Accordingly, the Universal TAI may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the Universal TAI may take the form of a computer program product embodied in any tangible medium of expression having computer usable program code embodied in the medium.

Any combination of one or more computer usable or computer readable medium(s) may be utilized. The computer-usable or computer-readable medium may be, by way of example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the Universal TAI may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The Universal TAI is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

As used herein, a "user principal" is a data structure stored by an application server that is used to authorize a user's requests.

As used herein, a "fundamental identification" is an identification determined by a TAI. The fundamental identification is used to generate a user's credentials for authorizing requests by applications hosted by an application server and for authorizing requests from different sources using different protocols. The fundamental identification is associated with a user principal of an application server. An example of a fundamental identification is username@domain_name.

Figure 1:
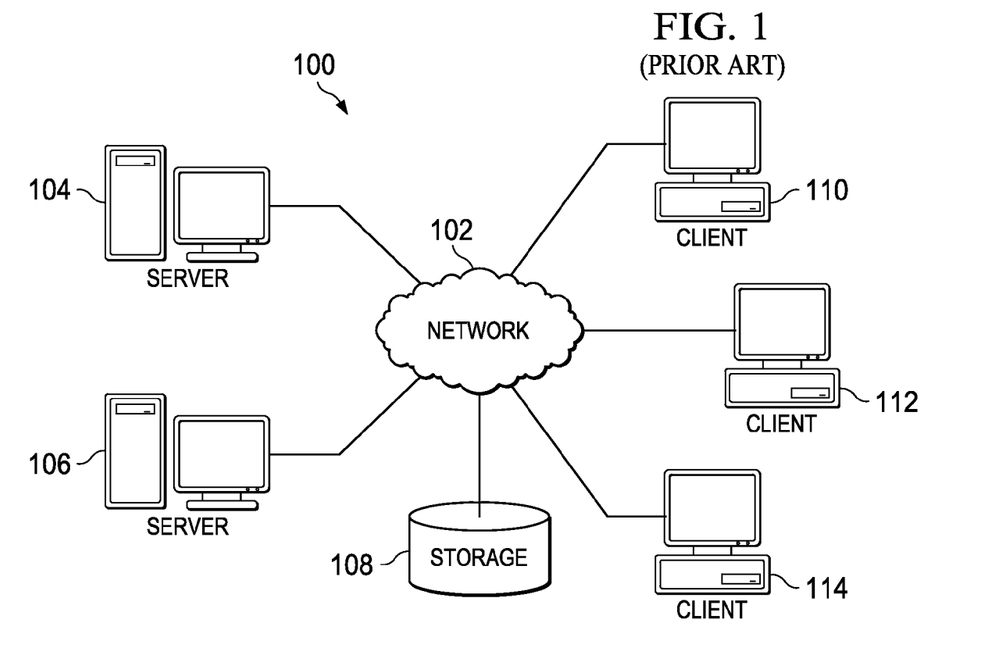
FIG. 1 is an exemplary computer network.
Figure 2:
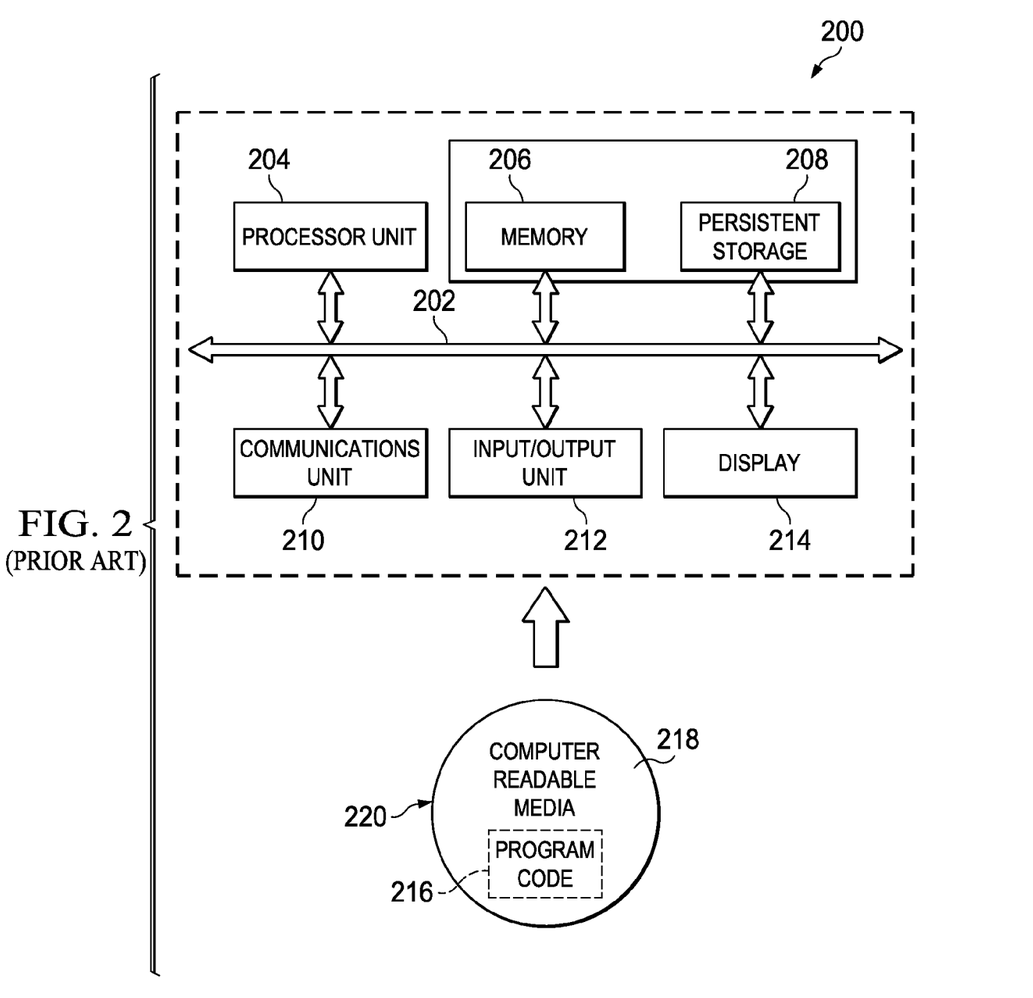
FIG. 2 is an exemplary computer framework.

Additionally, the Universal TAI is described below with reference to an exemplary network of hardware devices, as depicted in FIGS. 1-2.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. Computer readable media 218 also may take the form of non-tangible media, such as communications links or wireless transmissions containing program code 216.

In some illustrative embodiments, program code 216 may be downloaded over a network to persistent storage 208 from another device or data processing system for use within data processing system 200. For instance, program code 216 stored in a computer readable storage medium in a server data processing system may be downloaded over a network from the server to data processing system 200. Data processing system 200 providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code 216. As one example, data processing system 200 may include inorganic components integrated with organic components and/or may be comprised entirely of organic components excluding a human being. For example, a storage device may be comprised of an organic semiconductor. As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
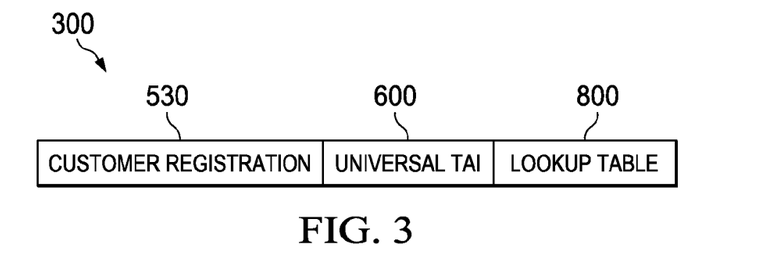
FIG. 3 is an exemplary computer memory.

Regarding FIG. 3, memory 300 is an exemplary memory containing Universal TAI 600 which is employed in conjunction with Customer Registration Program 530 and Lookup Table 800, also contained in memory 300 as represented in FIG. 3. The elements depicted in memory 300 may be located in or distributed across separate memories in any combination, and each program may be adapted to identify, locate, and access any of the elements and coordinate actions, if any, by the distributed elements. Thus, FIG. 3 is included merely as a descriptive expedient and does not necessarily reflect any particular physical embodiment of memory 300. As depicted in FIG. 3, though, memory 300 may include additional data and programs (not shown).

Figure 4:
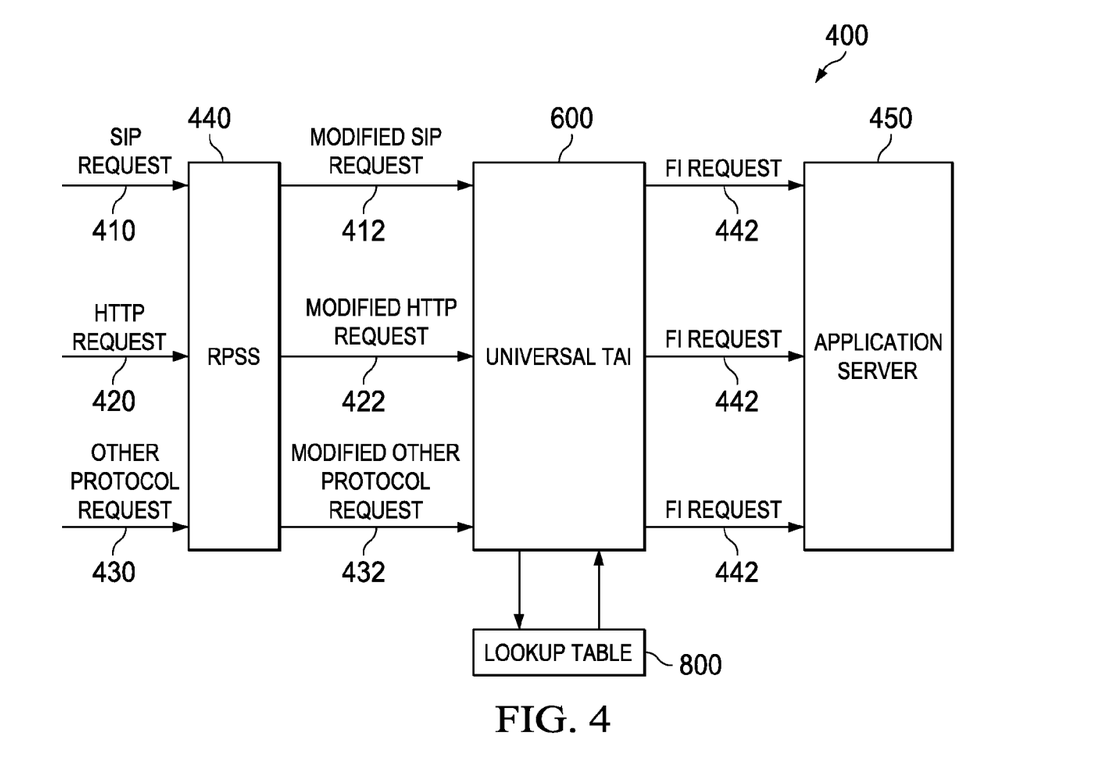
FIG. 4 is a diagram illustrating a flow of information for an embodiment of the invention.

FIG. 4 is a diagram illustrating flow of information 400 for an embodiment of the Universal TAI 600. RPSS 440 is set up as a front-end authentication server for application server 450 and receives incoming requests that are to be handled by application server 450. In order to maintain the trust between an RPSS, such as RPSS 440, and an application server, such as application server 450, RPSS 440 and Universal TAI 600 agree on how user identification data will be associated with various incoming requests. This agreement may be accomplished by programming the RPSS to place user identification data into a particular header field of a request and having the Universal TAI retrieve the user identification information from that particular header field. Embodiments of the invention may also place the user identification information into a cookie associated with the request. Alternative embodiments may provide for dynamically changing how the user identification data will be associated with a user request. One such alternative embodiment may have the RPSS describe to the TAI the location and format of user identification data that the RPSS is associating with a request. Another alternative embodiment may have the TAI describe to the RPSS where the TAI expects the user identification information to be located and formatted in association with a user request.

As depicted in FIG. 4, RPSS 440 receives SIP request 410 and HTTP request 420, which are each from the same user (not shown). Alternatively, RPSS 440 may receive Other Protocol Request 430. Persons skilled in the art understand that additional requests could be received in other protocols, and the same procedure would apply to those other protocols. Other Protocol Request 430 is meant to represent requests in other protocols than SIP or HTTP. After receiving SIP request 410 and HTTP request 420, RPSS 440 modifies SIP request 410 to include user identification information in a format that accords with the SIP protocol to create modified SIP request 412. RPSS 440 modifies HTTP request 420 to include user identification information in a format that accords with the HTTP protocol to create modified HTTP request 422. In like manner, RPSS 440 would modify other protocol request 432 to include user identification information in a format that accords with the other protocol to create modified other protocol request 432. As used herein, other protocol request 430 represents any other protocol besides SIP and HTTP in which a request might be made, and modified other protocol request represents any modified request based on a protocol which is not SIP or HTTP. After an incoming request is modified by RPSS 440 to include the user identification data, RPSS 440 dispatches the request to application server 450 which is responsible for handling the request. Universal TAI 600 is operable to handle the type and/or protocol of the requests intercepted from RPSS 440.

Universal TAI 600 looks up a customer's fundamental identification from the user identification information, associated with the request by RPSS 440, in lookup table 800. Lookup table 800 is populated for each user at registration (see FIG. 5) by entering the user's fundamental identification into lookup table 800 for each protocol and request variation. For example, a lookup table, such as lookup table 800, may be as follows:

TABLE 1

| Fundamental Identification | Request format of user identification data |
|---|---|
| username@domain_name | <sip: username@domain_name>;transport=tcp |
| username@domain_name | "username@domain_name" |
| username@domain_name | Request formatted for other protocol |

As an example, when the request is a SIP request, Universal TAI 600 looks up the fundamental identification from the user identification information in the P-Asserted-Identity field, which is found in line 2 of Table 1. As another example, when the request is an HTTP request, Universal TAI 600 looks up the fundamental identification using the user identification information in the X-3GPP-Asserted-Identity field in line 3 of Table 1. In like manner, when the request is another protocol request, Universal TAI 600 looks up the fundamental identification in the fourth line of Table 1.

After Universal TAI 600 looks up the fundamental identification, the request is assigned to a user principal of the application server. The assigning to a user principal of application server 450 is accomplished by incorporating the fundamental identification into a credential supplied by RPSS 440 for use by application server 450. Continuing the above examples, even though the SIP request and the HTTP request comprise different user identification information in different fields of different types of requests utilizing different protocols, the requests are assigned to the same user principal of the application server. Hence, the same credentials would be generated from both requests and would be authorized for the same user principal.

Still referring to FIG. 4, Universal TAI 600 receives modified SIP request 412 and looks up the fundamental identification corresponding to the SIP protocol user identification in lookup table 800, and substitutes the fundamental identification for the protocol user identification in modified SIP request 412 to generate fundamental identification request 442. Universal TAI 600 passes fundamental identification request 442 to application server 450. In like manner, Universal TAI 600 receives modified HTTP request 422 and looks up the fundamental identification corresponding to the HTTP protocol user identification in lookup table 800 and substitutes the fundamental identification for the protocol user identification in the modified HTTP request 422 to generate fundamental identification request 442. Universal TAI 600 passes fundamental identification request 442 to application server 450. When a request is in another protocol, such as other protocol 430, Universal TAI 600 receives other protocol request 430, looks up the fundamental identification corresponding to other protocol user identification in lookup table 800 and substitutes the fundamental identification for the other protocol user identification in the modified other protocol request 432, and generates fundamental identification request 442. Universal TAI 600 passes the request to application server 450.

Through the use of Universal TAI 600, all requests will be recognized as coming from the user principal. A request of any type or protocol may be handled with each type of request or protocol having the Universal TAI determining the fundamental identification of the request from lookup table 800. As such, systems embodying the Universal TAI and lookup table allow application server 450 to receive all requests as coming from the same user principal. This is advantageous in a variety of situations. For example, when a user logs in to a web page and the web page asks the user to call a phone number on the web page, the phone call can be received by the application server as from the same user principal in the same session without breaking the session. Without the invention, when a session begins with an HTTP request, and a SIP request is received from the same user principal in the same session, the SIP request would not be recognized as part of the session and the user would have to log in again at the web site. Persons skilled in the art are aware of additional scenarios in which the Universal TAI and lookup table will facilitate recognition and assertion of identity. Application server 450 can assert the authentication of the user principal based on the fundamental identification regardless of the type of protocol of a request.

Figure 5:
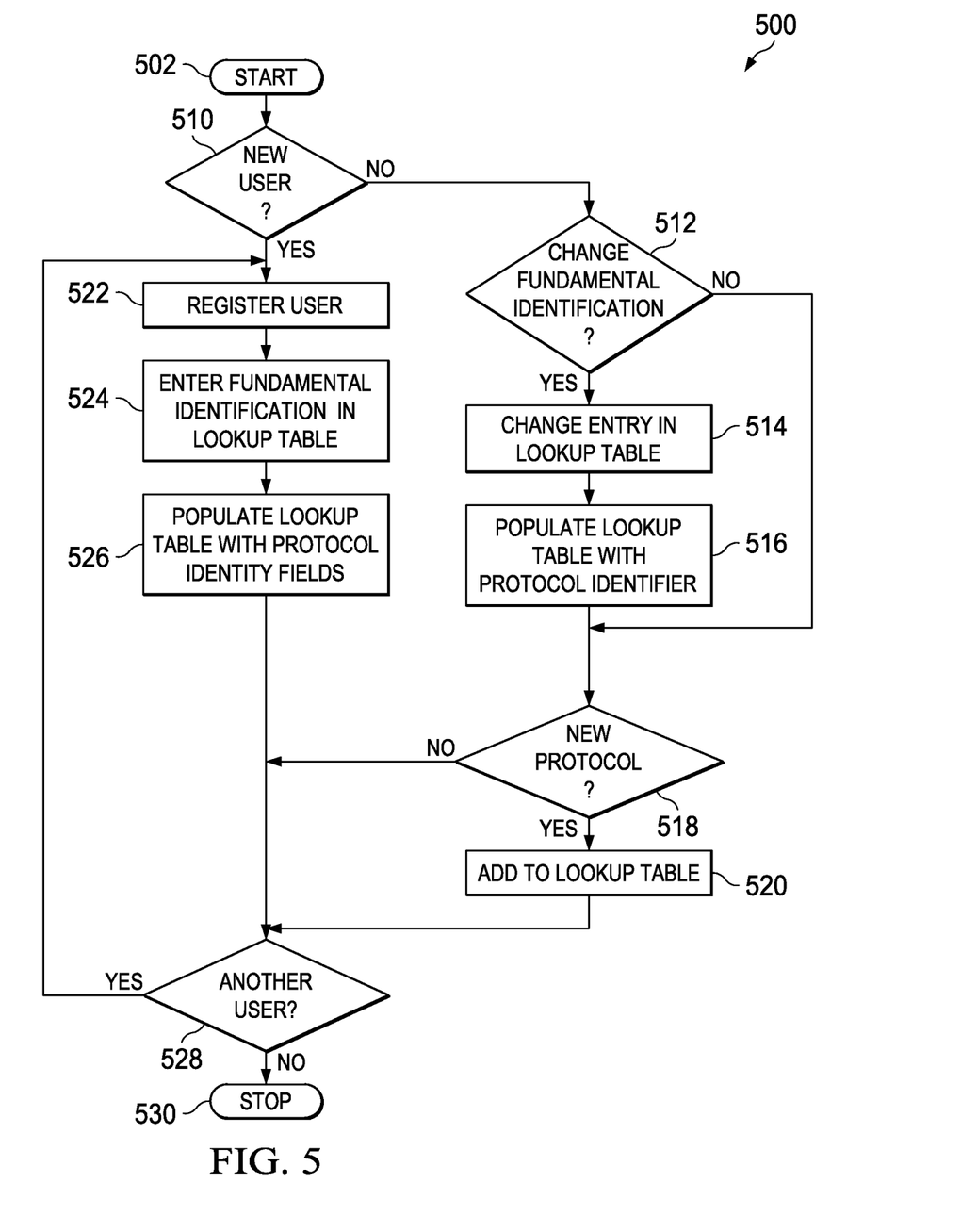
FIG. 5 is a flowchart illustrating registration of customers and population of the lookup table for an embodiment of the invention.

FIG. 5 is a flowchart illustrating registration process 500 for registration of users and population of the lookup table for an embodiment of the invention. Registration process 500 begins (step 502), and a determination is made whether a new user is to be registered (step 510). If a new user is registered, but needs to make a change, registration process 500 determines whether a change is to be made to a user's fundamental identification (step 512). If a change is to be made to the user's fundamental identification, then the new user's fundamental identification is entered in the lookup table (step 514) and the lookup table is populated with the SIP identity, HTTP identity and other protocol identity for the new fundamental identification (step 516) and registration process 500 goes to step 518. At step 518, a determination is made whether a new protocol is to be added (step 518), and when a new protocol is to be added, the new protocol is added to the lookup table (step 520). If no new protocol is to be added, registration process 500 goes to step 528. When, at step 510, a new user is to be registered, the user is registered (step 522), the user's fundamental identification is entered in the lookup table (step 524), and the lookup table is populated with the SIP identity, HTTP identity and other protocol identity for the new fundamental identification (step 526). A determination is made whether there is another user to register (step 528), and if so, registration process 500 goes to step 522, and if not, stops (step 530).

Figure 6:
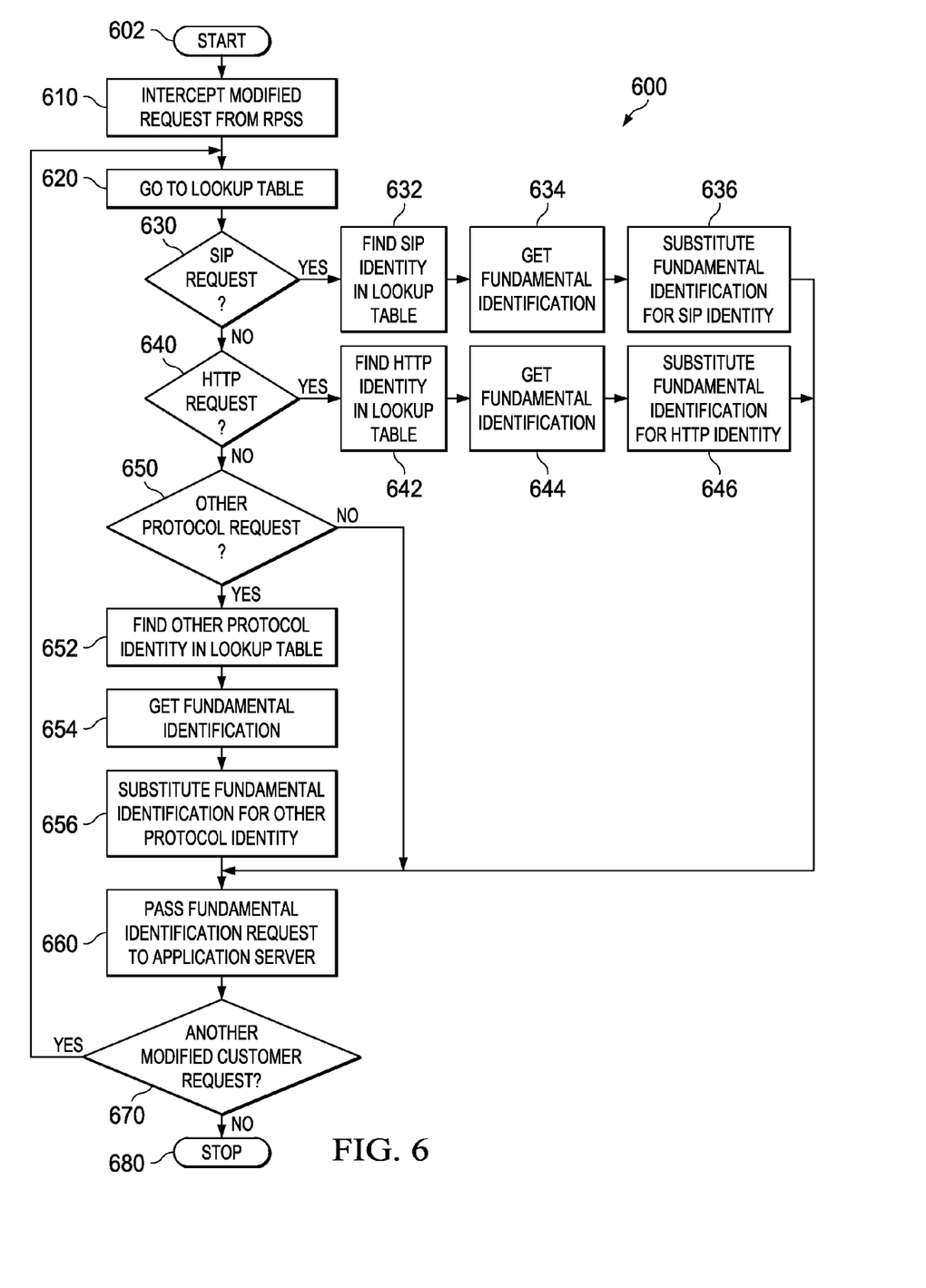
FIG. 6 is a flowchart of the operation of the Universal TAI for an embodiment of the invention.

FIG. 6 is a flowchart of the operation of the Universal TAI 600 for an embodiment of the invention. Universal TAI 600 starts (step 602), and intercepts a modified request from an RPSS (610). Universal TAI 600 goes to the lookup table (step 620). When an intercepted request is a SIP request (step 630), the RPSS has placed the user identification into the P-Asserted-Identity field of the SIP request header, formatted in accordance with the SIP protocol. For instance, when the user identification data includes fundamental identification:

username@ domain_name the RPSS may place user identification:

<sip: username@ domain_name>;transport=tcp into the P-Asserted-Identity field of the SIP request header. Universal TAI 600 finds the SIP user identification in the lookup table (step 632), obtains the user's fundamental identification from the lookup table (step 634), substitutes the fundamental identification into the P-Asserted-Identify field of the SIP request header (step 636), and goes to step 660.

When an intercepted request is an HTTP request (step 640), the RPSS has placed the user identification data into the X-3GPP-Asserted-Identity field of the HTTP request header formatted in accordance with the HTTP protocol (step 650). For instance, when the user identification includes fundamental identification:

username@ domain_name the RPSS may place user identification data (including the double quotes):

"username@ domain_name"

into the X-3GPP-Asserted-Identity field of the HTTP request header. Then when the incoming request is an HTTP request (step 640), Universal TAI 600 finds the X-3GPP-Asserted-Identity field for the HTTP user identification in the lookup table (step 642), obtains the user's fundamental identification (step 644), and substitutes the fundamental identification into the X-3GPP-Asserted-Identify field of the HTTP request header (step 646), and goes to step 660.

When an incoming request is another protocol request (step 650), the RPSS places the user identification data into the other protocol field of the other protocol request header formatted in accordance with the other protocol. Then when the incoming request is another protocol request, Universal TAI 600 finds the other protocol identity field for the user's other protocol identification in the lookup table (step 652), obtains the user's fundamental identification from the lookup table (step 654), and substitutes the fundamental identification into the other protocol field of the other protocol request header (step 656), and goes to step 660. At step 660, Universal TAI 600 passes the fundamental identification request to the application server (step 670). If there is another modified request to process, Universal TAI 600 goes to step 620, otherwise it stops (step 680).

Figure 7:
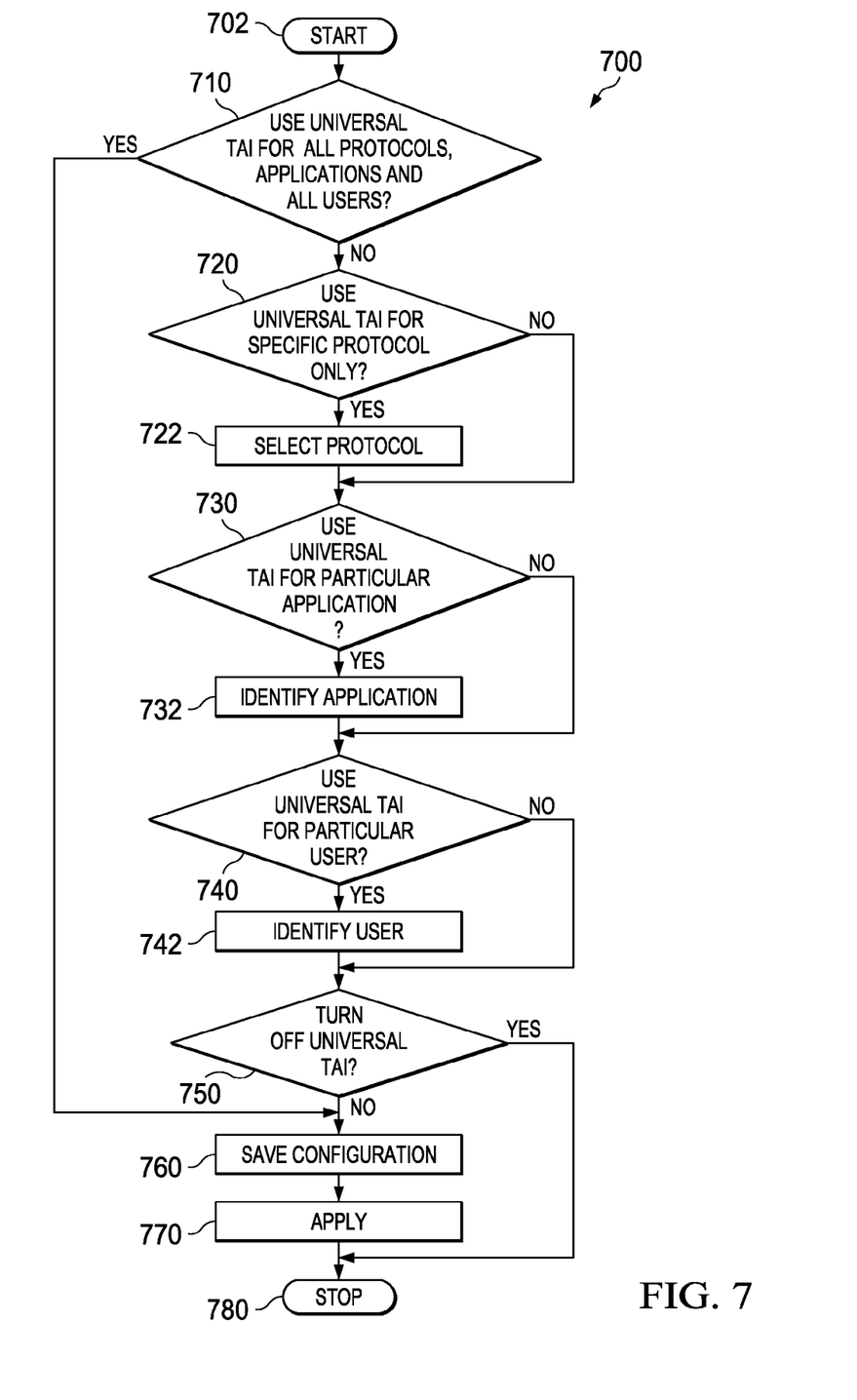
FIG. 7 is a flowchart of a configuration program of the Universal TAI.

FIG. 7 is a flow chart of a configuration program of the Universal TAI. Configuration program 700 allows a system administrator to selectively employ the Universal TAI. Configuration program 700 starts (step 702) and a determination is made as to whether the system administrator wants to use the Universal TAI for all protocols, all applications, and all users (step 710) and if so, configuration process 700 goes to step 760. When the system administrator does not want to use the Universal TAI for all protocols, applications, and users, a determination is made whether the system administrator wants to use the Universal TAI for a specific protocol (step 720). If so, the specific protocol is selected (step 722) and configuration process goes to step 730. If not, a determination is made whether the system administrator wants to use Universal TAI 600 for one or more particular applications (step 730). If so, the particular applications are identified (step 732). If not, configuration process 700 goes to step 740, where a determination is made whether the system administrator wants to use Universal TAI 600 for one or more particular users (step 740). If so, the particular users are identified (step 742). If not, configuration process 700 determines whether the system administrator wants to turn off the Universal TAI (step 750). If so, configuration process stops (step 780). If not, configuration process 700 saves the selected and identified configuration (step 760), applies the configuration (step 770) and stops (step 780).

The flowchart and block diagrams in the Figures illustrate the architecture, functionality, and operation of possible implementations of systems, methods and computer program products according to various embodiments of the Universal TAI. In this regard, each block in the flowchart or block diagrams may represent a module, segment, or portion of code, which comprises one or more executable instructions for implementing the specified logical function(s). It should also be noted that in some alternative implementations the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the Universal TAI has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

What is claimed is:

1. A computer-implemented method for authenticating and authorizing requests from a user that are serviced by an application server, comprising:
receiving at different times in a reverse proxy security server a first request in accordance with a first communications protocol and a second request in accordance with a second communications protocol that is different than the first communications protocol, both protocols being received in association with a same end user;
creating, by the reverse proxy security server in response to receiving the first request, a modified form of the first request by retrieving user identification information for the end user, modifying the first request to include the user identification information formatted in accordance with the first communications protocol, and dispatching the modified form of the first request to an application server in which a universal trust association interceptor executes;
creating, by the reverse proxy security server in response to receiving the second request, a modified form of the second request by retrieving the user identification information for the end user, modifying the second request to include the user identification information formatted in accordance with the second communications protocol, and dispatching the modified second request to the application server;
and,
responding a receipt of the first request in the universal trust association interceptor, by looking up in a lookup table a fundamental identification corresponding both to the user identification information in the first communications protocol, and also the first communications protocol, substituting in the first request the fundamental user identification for the user identification information to create a first fundamental identification request, and passing the first fundamental identification request to the application server, but responding to a receipt of the second request in the universal trust association interceptor, by looking up in the lookup table the fundamental identification corresponding both to the user identification information in the second communications protocol and also the second protocol, substituting in the second request the fundamental user identification for the user identification information to create a second fundamental identification request, and passing the second fundamental identification request to the application server.

2. The computer-implemented method of claim 1, further comprising:
responsive to a multiplicity of customers registering with a service for the application server, populating the lookup table with a multiplicity of different customer fundamental identifications, wherein each of the customer fundamental identifications corresponds to a multiplicity of different user identification information entries in the lookup table, one for each corresponding different communications protocols.

3. The computer-implemented method of claim 1, further comprising:
creating the lookup table in the universal trust association interceptor.

4. The computer-implemented method of claim 1, further comprising:
authorizing the first and second requests, at the application server, based upon the fundamental user identification.

5. The computer-implemented method of claim 1, further comprising:
assigning the first and second requests to a user of the application server based upon the fundamental user identification;
wherein the application server recognizes a single user associated with the fundamental identification irrespective of a communications protocol utilized in receipt of the first and second requests.

6. A computer-implemented method for mapping user requests to a user principal, comprising:
associating by a reverse proxy server a first user identification information with a first user request received in accordance with a first communications protocol and a second user identification information with a second user request received in accordance with a first communications protocol;
dispatching the first user request and the second user request to an application server by the reverse proxy security server;
determining by a universal trust association interceptor a fundamental identification of the first user request from the first user identification data and also determining by the universal trust association interceptor the same fundamental identification of the second user request from the second user identification data; and,
assigning the first user request and the second user request to a principal user of the application server based on the fundamental identification;
wherein the application server recognizes a single principal user regardless of the differences between the first user identification data and the second user identification data resulting from the first and second communications protocol.

7. The computer-implemented method of claim 6 wherein the determining of the fundamental identification of the first user request performs steps comprising:
when the first user request is a hypertext transfer protocol request and the reverse proxy security server and the universal trust association interceptor agree that the first user identification data will be placed in an X-3GPP-Asserted-Identity field of a header the first user request, looking up the fundamental identification in a lookup table by finding the first user's X-3GPP-Asserted-Identity field in the lookup table.

8. The computer-implemented method of claim 6 wherein the determining of the fundamental identification of the second user request performs steps comprising:
when the second user request is a session initiation protocol request and the reverse proxy security server and the universal trust association interceptor agree that the second user identification data will be placed in a P-Asserted-Identity field of a header of the second user request, looking up the fundamental identification in a table by finding the second user's P-Asserted-Identity field in the lookup table.

9. The computer-implemented method of claim 6, further comprising:
agreeing between the reverse proxy security server and the universal trust association interceptor a third user identification data will be placed in a cookie associated with a third user request.

10. The computer-implemented method of claim 9, further comprising:
determining the fundamental identification of the third user request by looking up the fundamental identification corresponding to the third user identification in a lookup table.

11. The computer-implemented method of claim 10, further comprising:
assigning the third user request to the principal user of the application server based upon the fundamental identification;
wherein the application server recognizes the principal user irrespective of differences between the first user identification data, the second user identification data, and the third user identification data.

12. An apparatus for authenticating and authorizing requests from a user that are serviced by an application server, the apparatus comprising:
a computer connected to an application server and to a reverse proxy security server by a network;
a plurality of instructions stored in the memory, the plurality of instructions adapted to cause a processor of the computer to perform steps comprising:
receiving at different times in the reverse proxy security server a first request in accordance with a first communications protocol and a second request in accordance with a second communications protocol that is different than the first communications protocol, both protocols being received in association with a same end user;
creating, by the reverse proxy security server, in response to receiving the first request a modified form of the first request by retrieving user identification information for the end user, modifying the first request to include the user identification information formatted in accordance with the first communications protocol, and dispatching the modified form of the first request to an application server in which a universal trust association interceptor executes;
creating, by the reverse proxy security server in response to receiving the second request, a modified form of the second request by retrieving the user identification information for the end user, modifying the second request to include the user identification information formatted in accordance with the second communications protocol, and dispatching the modified second request to the application server;
and
responding a receipt of the first request in the universal trust association interceptor, by looking up in a lookup table a fundamental identification corresponding both to the user identification information in the first communications protocol, and also the first communications protocol; substituting in the first request the fundamental user identification for the user identification information to create a first fundamental identification request, and passing the first fundamental identification request to the application server, but responding to a receipt of the second request in the universal trust association interceptor, by looking up in the lookup table the fundamental identification corresponding both to the user identification information in the second communications protocol and also the second protocol, substituting in the second request the fundamental user identification for the user identification information to create a second fundamental identification request, and passing the second fundamental identification request to the application server.

13. The apparatus of claim 12, further comprising:
responsive to a multiplicity of customers registering with a service for the application server, populating the lookup table with a multiplicity of different customer fundamental identifications, wherein each of the customer fundamental identifications corresponds to a multiplicity of different user identification information entries in the lookup table, one for each corresponding different communications protocols.

14. The apparatus of claim 12, further comprising:
creating the lookup table in the universal trust association interceptor.

15. The apparatus of claim 12, further comprising:
authorizing the first and second requests, at the application server, based upon the fundamental user identification.

16. The apparatus of claim 12, further comprising:
assigning the first and second requests to a user of the application server based upon the fundamental user identification;
wherein the application server recognizes the principal user irrespective of differences between the first user identification data, the second user identification data, and the third user identification data; and
wherein the application server recognizes a single user associated with the fundamental identification irrespective of a communications protocol utilized in receipt of the first and second requests.

17. A computer program product for mapping user requests to a user principal, the computer program product comprising a non-transitory computer readable storage medium having computer readable program code embodied therewith, the computer readable program code when executed by a computer:
associating by a reverse proxy server a first user identification information with a first user request received in accordance with a first communications protocol and a second user identification information with a second user request received in accordance with a first communications protocol;
dispatching the first user request and the second user request to an application server by the reverse proxy security server;
determining by a universal trust association interceptor a fundamental identification of the first user request from the first user identification data and also determining by the universal trust association interceptor the same fundamental identification of the second user request from the second user identification data; and,
assigning the first user request and the second user request to a principal user of the application server based on the fundamental identification;
wherein the application server recognizes a single principal user regardless of the differences between the first user identification data and the second user identification data resulting from the first and second communications protocol.

18. The computer program product of claim 17, wherein the determining of the fundamental identification of the first user request performs steps comprising:
when the first user request is a hypertext transfer protocol request and the reverse proxy security server and the universal trust association interceptor agree that the first user identification data will be placed in an X-3GPP-Asserted-Identity field of a header, looking up the fundamental identification in a lookup table by finding the first user's X-3GPP-Asserted-Identity field in the lookup table.

19. The computer program product of claim 17, wherein the determining of the fundamental identification data of the second user request performs steps comprising:
when the second user request is a session initiation protocol request and the reverse proxy security server and the universal trust association interceptor agree that the second user identification data will be placed in a P-Asserted-Identity field of a header of the second user request, looking up the fundamental identification in a lookup table by finding the second user's P-Asserted-Identity field in the lookup table.

20. The computer program product of claim 17, further comprising:
agreeing between the reverse proxy security server and a third trust association interceptor that a third user identification data will be placed in a cookie associated with a third user request.

21. The computer program product of claim 17, further comprising:
determining the fundamental identification of the third user request by looking up the third identification from a cookie in a lookup table.

22. The computer program product of claim 17, further comprising:
assigning the third user request to the principal user of the application server based upon the fundamental identification;
wherein the application server recognizes the principal user irrespective of differences between the first user identification data, the second user identification data, and the third user identification data.

* * * * *